United States Patent [19]

Levy

[11] Patent Number: 4,555,851

[45] Date of Patent: Dec. 3, 1985

[54] X-Y TABLES PARTICULARLY FOR USE AS PLOTTERS

[76] Inventor: Nessim I. Levy, 13 Habrosh St., Savyon, Israel

[21] Appl. No.: 613,121

[22] Filed: May 23, 1984

[30] Foreign Application Priority Data

Jul. 8, 1983 [IL] Israel ................................. 69183

[51] Int. Cl.$^4$ ............................................. B43L 13/00
[52] U.S. Cl. ..................................... 33/18 R; 33/1 M
[58] Field of Search .................... 33/1 M, 18 R, 23 C, 33/139 R, 139 B, 139 C

[56] References Cited

U.S. PATENT DOCUMENTS

| 874,384 | 12/1907 | Blair | 33/26 |
|---|---|---|---|
| 3,593,426 | 7/1971 | Domagalski | 33/18 R |
| 4,186,404 | 1/1980 | Guyot et al. | 33/18 R X |

Primary Examiner—Harry N. Haroian
Attorney, Agent, or Firm—Benjamin J. Barish

[57] ABSTRACT

An X-Y table particularly for use as a plotter comprises a displaceable head including a holder for a working implement and X-axis and Y-axis carriages for displacing the head along the respective axis of the table. The displaceable head includes a second holder for a second working implement on the opposite side of the displaceable head, whereby either working implement may be selectively enabled to permit substantially the complete tabel area to be used for working purposes.

9 Claims, 3 Drawing Figures

X-Y TABLES PARTICULARLY FOR USE AS PLOTTERS

BACKGROUND OF THE INVENTION

The present invention relates to X-Y tables, namely tables for positioning working implements carried thereby to preselected points along the X and Y coordinates. This invention is particularly useful for, and is therefore described below with respect to, X-Y plotters which include a plotter board, a displaceable head having a holder for a marking implement, and X-axis and Y-axis carriages for displacing the head, and thereby the marking implement, along the X-axis and Y-axis of the plotter board.

In the conventional plotter boards of this type, the net working area of the board usable for plotting purposes is significantly reduced because of the dimensions of the displaceable head, the X-axis and Y-axis carriages, and the guiding devices for the carriages. For example, if the holder for the marking implement is located at the center of the displaceable head, there are areas on each side of the displaceable head, and also on each side of the carriages and their guiding devices, which are not usable for plotting purposes. Moreover, in order to insure accurate linear movements of the carriages along their respective axes, relatively wide guiding mechanisms are required, and the higher the accuracy and stability desired, the wider is the guiding mechanism required. These requirements for high accuracy and stability thus further reduce the net working area available for plotting purposes.

An object of the present invention is to provide an X-Y plotter having improvements in the foregoing respects.

SUMMARY OF THE INVENTION

According to a broad aspect of the present invention, there is provided an X-Y table comprising: a displaceable head including a holder for a working implement; an X-axis carriage for displacing said head along the X-axis of said table; and a Y-axis carriage for displacing said head along the Y-axis of said table; characterized in that said displaceable head includes at least a second holder for a second working implement, the first-mentioned holder being on one side of the displaceable head with respect to one of said axes, and the second holder being on the opposite side of the displaceable head with respect to said one axis; and selective enabling means sensing the position of said displaceable head and selectively enabling one or the other of said working implements to permit substantially the complete table area to be used for working purposes.

In the described embodiments, the selective enabling means comprises a first sensor for sensing when the displaceable head has passed a predetermined line along one axis on the table, a second sensor for sensing when the displaceable head has passed a predetermined line on the table along the other axis, and control means controlled by said sensors to automatically disable one working implement, enable the other working implement, and move the displaceable head to locate the enabled working implement to the position of the disabled working implement.

In one preferred embodiment described below, the two holders are positioned at diagonal points on the opposite sides of the displaceable head with respect to both the X-axis and Y-axis of the X-Y table. However, in such an embodiment, there is a small, rectangular dead space on the X-Y table unusable for working purposes at each of the two diagonal points of the table not reachable by the two working implements.

In order to make even this space available for use, a second embodiment of the invention is described herein wherein the displaceable head includes four holders for four working implements located at all four corners of the displaceable head, said control means being controlled by said sensors to automatically enable one working implement at any one time and to move the displaceable head to locate the enabled working implement to the position of the then disabled working implement.

In one implementation of this embodiment of the invention, the two sensors are located to sense when the displaceable head has passed the longitudinal axis and the transverse axis, respectively, of the plotting board. In such an arrangement, wherein each sensor divides its respective axis into two parts, there usually would be a large number of switch-overs from one working implement to another during the operation of this apparatus. In order to reduce this number of switch-overs, a second implementation is described wherein each axis is divided into three parts by two sensors for each axis. That is to say, there would be a total of four sensors which would divide the total table area into nine parts. One of these parts would constitute the main working area in which no switch-over would be necessary, the other eight parts constituting smaller areas along the borders of the main working part in which switch-overs would occur.

As indicated earlier, the invention is particularly useful for X-Y plotter boards wherein the working implements are working members, such as pens, and the invention is therefore described below with respect to this application.

Further features and advantages of the invention will be apparent from the description below.

BRIEF DESCRIPTION OF THE DRAWINGS

The invention as herein described, by way of example only, with reference to the accompanying drawings wherein.

DESCRIPTION OF PREFERRED EMBODIMENTS

Figure 1:
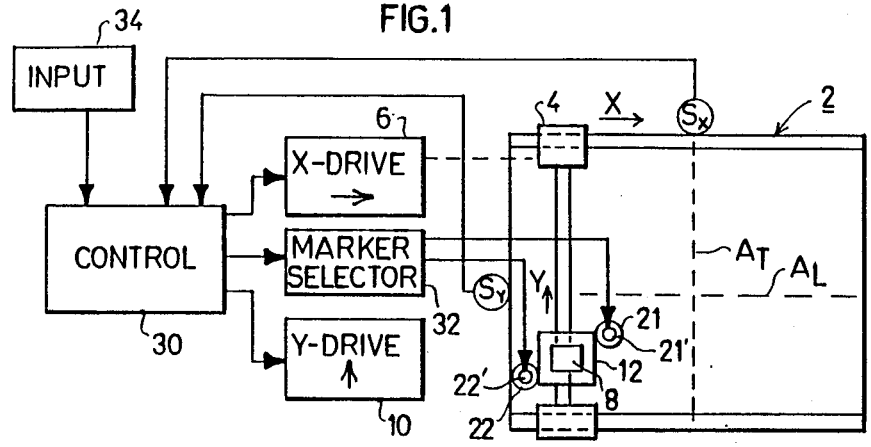
FIG. 1 illustrates one embodiment of X-Y plotter constructed in accordance with the present invention.

The X-Y plotter illustrated in FIG. 1 comprises a plotter board, generally designated 2, including an X-axis carriage 4 movable along the X-axis by an X-drive 6, X-drive 6, and a Y-carriage 8 movable along the Y-axis by a Y-axis drive 10. The Y-axis carriage 8 carries, or serves as, a head 12 for marking means, which head is displaceable by controlling the two drives 6, 10, over substantially the complete surface of the plotter board 2 to enable the marking means to plot points or lines along the X-axis and Y-axis of the plotter board.

X-Y plotters of the foregoing construction, insofar as described above, are quite well-known and therefore a further description of the details of the construction and operation of such plotters is not deemed necessary here.

As indicated earlier, in the conventional X-Y plotter construction the displaceable head 12 includes a holder for a single marking implement, which results in a significant reduction in the total area of the plotter board 2 usable for plotting purposes. Thus, if the marking implement holder is located at the center or at one side of the displaceable head 12 in the conventional construction, a considerable portion of the other sides of the plotter board 2 would not be usable for plotting purposes because of the space occupied by the displaceable head, the carriages, and/or the guiding devices for the carriages.

These drawbacks in the conventional X-Y plotter construction are avoided by the novel plotter illustrated in FIG. 1 which enables more efficient use of the complete plotting surface.

Thus, as shown in FIG. 1, the displaceable head 12 carried by the Y-axis carriage 8 includes two holders 21, 22, each capable of holding a separate marking implement 21', 22', such as a pen, pencil, electrically-energized electrode, or the like. As also shown in FIG. 1, the two holders 21, 22 are disposed at diagonal points on the outer extremities of the displaceable head 12; that is, marking-implement holder 21 is located at the upper right-hand corner of the head, and marking implement 22 is located at the lower lefthand corner of the head.

The marking implements 21', 22', carried by the two holders 21, 22, are selectively actuated under the control of two sensors $S_x$, $S_y$ via a control circuit indicated schematically by block 30. Sensor $S_x$ is located in alignment with the transverse axis $A_t$ of the plotter board, and sensor $S_y$ is located along the longitudinal axis $A_l$ of the plotter board. Control circuit 30 in turn controls a marker selector circuit 32 which selectively actuates one or the other of the two marking implements 21', 22'. For example, if the two marking implements are pens or pencils, the marker selector circuit 32 is effective to move the pen or pencil, selected to be active, into contact with the paper on the plotter board 32, while moving the other pen or pencil out of contact with it. On the other hand, if the marking implements are electrodes producing a colour change on the plotter board paper when the selected electrode is actuated, then the marker selector circuit 32 would electrically energize the selected marker electrode while the other marking electrode would remain unenergized.

The input to the plotter illustrated in FIG. 1 is schematically indicated by block 34.

The operation of the system illustrated in FIG. 1 will be apparent from the above description. Thus, input 34 applied to the control unit 30 controls the X-drive 6 and the Y-drive 10 to position the displaceable head 12 according to the inputted coordinates along the X-axis and Y-axis, respectively. Whenever displaceable head 12 is above the longitudinal axis $A_l$ of the plotter board 2, sensor $S_y$ controls the marker selector circuit 32 via the control unit 30 to disable marker implement 22' and to enable marker implement 21', and vice versa, when the displaceable head 12 is below the longitudinal axis $A_l$. Similarly, whenever displaceable head 12 is to the left of the transverse axis $A_t$, sensor $S_x$ is effective, via control unit 30, to cause the marker selector circuit 32 to disable marker implement 21' and to enable marker implement 22'; and vice versa, when the displaceable head 12 is to the right of the transverse axis $A_t$ of the plotter.

When a switch-over from one marker implement to another is effected in the manner described above, control unit 30 also controls the X-drive 6 and Y-drive 10 to move head 12 such as to locate the enabled marker implement to the position occupied by the disabled one. This automatic re-positioning depends on fixed known parameters, namely the difference in location of the two marker implements on the head, and therefore can be pre-programmed into the control system 30.

It will thus be seen that the arrangement illustrated in FIG. 1 enables substantially the complete (but not quite the complete as will be described below), surface of the X-Y plotter board to be used for plotting purposes.

The complete surface of the plotter board is still not usable since there would be a small rectangular area in the upper left-hand corner of the plotter board, and a similar small rectangular area in the lower right-hand corner of the plotter board, which would still not be reachable by either marker implement. Actually, the left-hand corner of the plotter board could be made usable by locating the left-hand holder 22 at the upper part of the left side of its head 12, rather than at the lower part; but in such a case, the non-usable portion of the plotter board 2 at the lower part would be increased to extend the complete length of the lower end of the plotter board, which is the reason why it is preferable, in the FIG. 1 arrangement, to locate the left-hand holder 22 as the illustrated diagonal corner of the head 12 with respect to the right-hand holder 21.

However, even these relatively small areas of the plotter board which are not usable in the FIG. 1 arrangement, may be used by providing the displaceable head (12 in FIG. 1) with four holders for four marking implements at the four corners of the head, rather than with the two holders illustrated in FIG. 1 at the two diagonal corners of the head.

Figure 2:
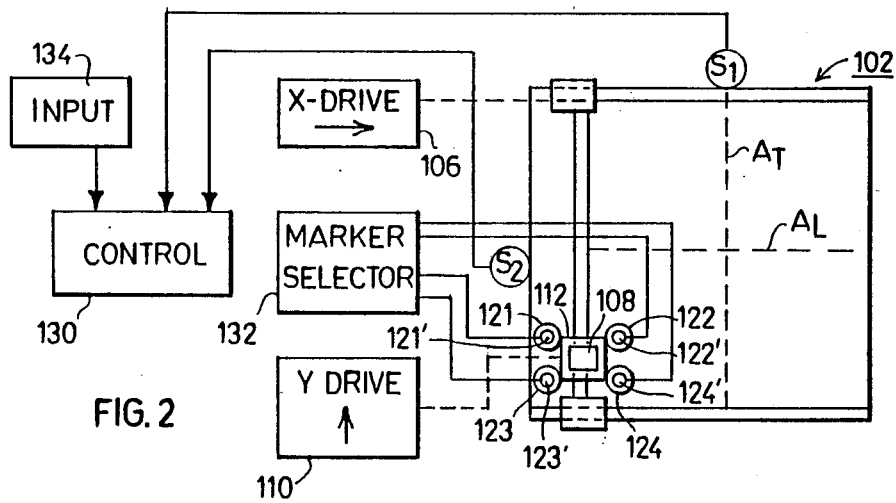
FIG. 2 illustrates a second embodiment of X-Y plotter constructed in accordance with the present invention.

Such a variation is illustrated in the system of FIG. 2, wherein it will be seen that the head, therein designated 112, is provided with four holders 121, 122, 123, 124, each adapted to hold a marking implement 121', 122', 123', and 124' which may be selectively actuated. In the arrangement of FIG. 2, there are also two sensors, namely sensor S1, S2 oriented along the transverse and longitudinal axes $A_t$, $A_l$, respectively, of the plotter board 102, as in the FIG. 1 arrangement.

The FIG. 2 system also includes an X-axis drive 106, a Y-axis drive 110, a control unit 130, a marker selector circuit 132, and an input unit 134, as in the FIG. 1 arrangement.

It will be appreciated that the FIG. 2 system operates similarly to that described above with respect to FIG. 1, except that since the displaceable head 112 carries four marker implements 121–124 at all four corners of the head, rather than two marker implements only at the two diagonals of the head, one marker implement will be active only when the displaceable head is in its one of the four quarters of the plotter board 102. Thus, marker implement 121' will be the active one when the head is in the upper left quarter; marker implement 122' will be the active one when the head is in the upper right quarter; marker implement 123' will be the active one when the head is in the lower left quarter; and marker implement 124' will be the active one when the head is in the lower right corner. The arrangement illustrated in page 2, therefore, enables the complete surface of the plotter board to be utilized for plotting purposes.

However, a disadvantage in the illustrated FIG. 2 arrangement is that there will be frequent switch-overs from one marker implement to another as the displaceable head 112 crosses the longitudinal and transverse axes of the plotter board. In practice, most of the plotting is done in the central area, and therefore the frequency of switch-overs of the marker implements can be substantially reduced by the modified arrangement illustrated in FIG. 3.

Figure 3:
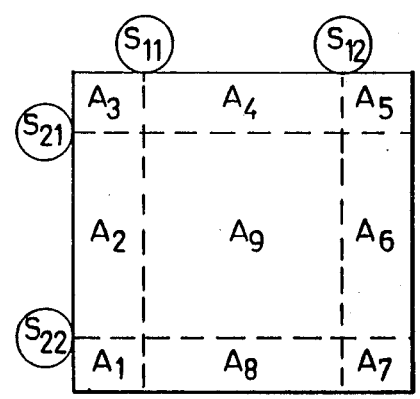
FIG. 3 illustrates a variation in the FIG. 2 embodiment.

The modified arrangement illustrated in FIG. 3 also utilizes four marking implement holders, one on each of the four corners of the head as in FIG. 2. In the FIG. 3 arrangement, however, there are a pair of sensors for each of the two axes, namely two X-axis sensors $S_{11}$, $S_{12}$, and two Y-axis sensors $S_{21}$, $S_{22}$. The two pairs of sensors are located adjacent to the opposite ends of the respective axes, with one sensor of each pair spaced from the end of the respective axis a distance at least equal to the distance between the end of the axis and the marking implement holder for the respective axis remote from that end. For example, sensor $S_{11}$ is spaced from the left end of the X-axis a distance which is at least equal to, and preferably slightly greater than the distance between holder 122 (i.e. from the marking point applied by its marking implement 122') and the left edge of the X-axis carriage, so that when the head 112, while moving leftwardly, crosses the line sensed by sensor $S_{11}$, the appropriate left marker implement (121' or 123') could be activated so as to be able to reach up to the left edge of the plotter board.

It will be seen from FIG. 3, therefore, that the four sensors divide the plotting board surface into nine areas, designated $A_1$–$A_9$. Area $A_9$, which occupies the central area of the plotter board, is by far the largest and covers most of the area of operation of the plotter. Accordingly, while the displaceable head is within this area, no switch-over needs to take place with respect to the marker implements 121–124. Only when the displaceable head moves from or to one of the other border areas $A_1$–$A_8$, which would be rather infrequent in most plotting applications, would it be necessary for a switch-over to be effected with respect to the marker implements.

The following table illustrates the marker implements capable of being effective in the nine areas $A_1$–$A_9$ of the plotter board illustrated in FIG. 3; it will thus be appreciated that only when the displaceable head moves from one area in which one marker implement was the active one, to another in which only another marker implement can be the active one, is it necessary to effect a switch-over.

| Area No. | Marker Implement Which May Be Active |
|---|---|
| $A_1$ | 123 |
| $A_2$ | 123, 121 |
| $A_3$ | 121 |
| $A_4$ | 121, 122 |
| $A_5$ | 122 |
| $A_6$ | 122, 124 |
| $A_7$ | 124 |
| $A_8$ | 124, 123 |
| $A_9$ | 121, 122, 123, 124 |

While the invention has been described with respect to X-Y plotter boards, it will be appreciated that the invention can be embodied in other types of X-Y tables, such as for engraving machines, milling machines or the like, for positioning other forms of working implements to preselected points along the X and Y coordinates.

Many other variations, modifications and applications of the invention may be made.

What is claimed is:

1. An X-Y table comprising: a displaceable head including a holder for a working implement; and X-axis carriage for displacing said head along the X-axis of said table; and a Y-axis carriage for displacing said head along the Y-axis of said table; characterized in that said displaceable head includes at least a second holder for a second working implement, the first-mentioned holder being on one side of the displaceable head with respect to one of said axes, and the second holder being on the opposite side of the displaceable head with respect to said one axis; and in that X-Y table further includes selective enabling means sensing the position of said displaceable head and selectively enabling one or the other of said working implements to permit substantially the complete table area to be used for working purposes.

2. The X-Y table according to claim 1, wherein said selective enabling means comprises a first sensor for sensing when the displaceable head has passed a predetermined line along one axis on the table, a second sensor for sensing when the displaceable head has passed a predetermined line on the table along the other axis, and control means controlled by said sensors to automatically disable one working implement, enable the other working implement, and move the displaceable head to locate the enabled working implement to the position of the disabled working implement.

3. The X-Y table according to claim 2, wherein said two holders are positioned on the opposite sides of the displaceable head with respect to the X-axis of the table.

4. The X-Y table according to claim 3, wherein said two holders are positioned at diagonal points on the opposite sides of the displaceable head with respect to both the X-axis and Y-axis of the table.

5. The X-Y table according to claim 4, wherein said displaceable head includes four holders for four working implements located at all four corners of the displaceable head, said control means being controlled by said sensors to automatically enable one working implement at any one time and to move the displaceable head to locate the enabled working implement to the position of the then disabled working implement.

6. The X-Y table according to claim 2,
wherein the two sensors are located to sense when the displaceable head has passed the longitudinal and transverse axes, respectively, of the table.

7. The X-Y table according to claim 2,
wherein there are a first pair of sensors for sensing when the displaceable head has passed each of two predetermined lines along the X-axis of the table, and a second pair of sensors for sensing when the displaceable head has passed each of two predetermined lines along the Y-axis of the table.

8. The X-Y table according to claim 7, wherein each of the two pairs of sensors is located adjacent to the opposite ends of the respective axis but is spaced therefrom a distance at least equal to the distance between the respective end of the axis and the holder for the respective axis which is remote from that end.

9. The X-Y table according to claim 1,
wherein the table is a plotter board, and the working implements are marking implements.

* * * * *